United States Patent [19]

Riccio et al.

[11] Patent Number: 4,939,015

[45] Date of Patent: Jul. 3, 1990

[54] COMBINATION THERMALLY SPRAYED ANTIFOULING METAL COATING AND SEAL COAT ON A MARINE SURFACE AND METHOD OF PREPARING SAME

[76] Inventors: Louis M. Riccio, P.O. Box 81, DeVault, Pa. 19432; Alexander A. Bosna, 135 Summit Rd., Malvern, Pa. 19355

[21] Appl. No.: 237,124

[22] Filed: Aug. 29, 1988

[51] Int. Cl.⁵ .................... B32B 3/06; B05D 5/00
[52] U.S. Cl. .................... 428/142; 427/34; 427/204; 427/404; 427/405; 427/407.1; 427/407.3; 427/408; 427/409; 427/419.5; 427/422; 427/423; 428/143; 428/325; 428/907
[58] Field of Search ............ 427/404, 407.3, 423, 427/405, 204, 407.1, 408, 422, 409, 410, 419.5, 34; 428/142, 143, 325, 907

[56] References Cited

U.S. PATENT DOCUMENTS 4,444,804  4/1984  Ferrari ................ 427/423 X
4,618,504  10/1986  Bosna et al. ........... 427/423 X
4,663,181  5/1987  Murali ................ 427/423 X Primary Examiner—Evan Lawrence
Attorney, Agent, or Firm—Jim Zegeer

[57] ABSTRACT

A combination thermally sprayed antifouling metal coating and seal coat on a marine surface and a method of preparing the same. The method comprises the steps of applying a resin coating on the marine surface, and thermally spraying molten metal particles on the resin coating to impinge and interlock with the resin coating and form one or more metal layers. The resin may be wet during the thermal spraying or be filled with hollow beads and spheres which are ruptured after curing to form locking sites for the metal coating. A seal overcoat is applied to the last one of the one or more metal layers. The seal overcoat when applied has low surface tension to permit wetting and penetration of the outer one of the one or more metal coatings, leveling and flattening properties to produce a smooth finish on the more metal coatings, thixotropic properties, ablative properties, and a high copper oxide content for antifouling.

2 Claims, 2 Drawing Sheets

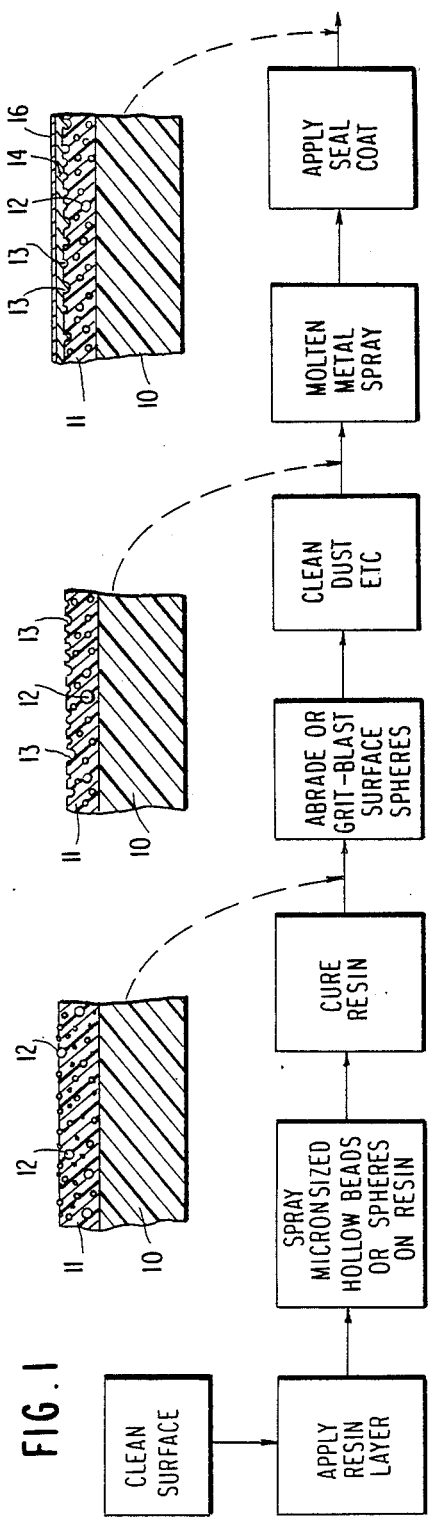
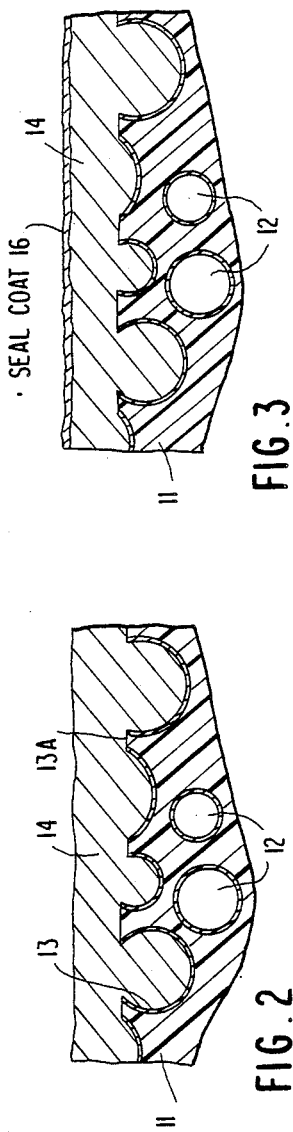
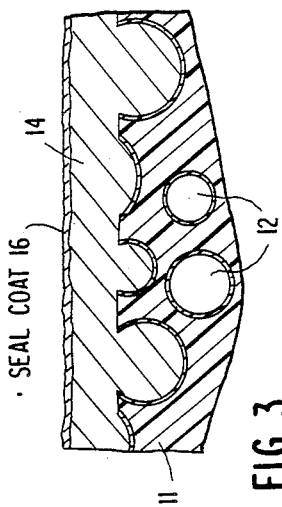

COMBINATION THERMALLY SPRAYED ANTIFOULING METAL COATING AND SEAL COAT ON A MARINE SURFACE AND METHOD OF PREPARING SAME

BACKGROUND AND BRIEF DESCRIPTION OF THE INVENTION:

In our U.S. Pat. No. 4,751,113 we disclose methods of providing a layer of metal on an adhesion and seal layer and in our U.S. Pat. Nos. 4,618,504 and 4,521,475 we disclose the adhesion and seal layer incorporating micron-sized hollow glass or ceramic spheres or spaces formed by foaming (syntactic foams) which are abraded or blasted so as to rupture the outermost layer of spheres, beads or spaces to provide a plurality of pores, nooks, crannies and undercuts for receiving the thermally sprayed metal which becomes imbedded into the undercuts, pores, nooks and crannies such that the bond or adherent strength of the metal coating is greatly improved. Further, in our U.S. Pat. No. 4,751,113, for marine surfaces, we disclose that a light weight wet sanding of the exposed metal surface produced a smoother marine surface. However, this light wet sanding removes some of the sprayed metal, typically copper or copper based alloys.

The purpose of the present invention is to obtain a smoother and better hydrodynamic surface. The roughness of thermal spray deposits ranges nominally from 300 to 450 micro inch finishes. A paint overcoat can reduce this roughness to less than 100 micro inches. This will avoid the need of smoothing the coating for optimum hydrodynamic performance, if desired. This sealer overcoat also allows a rougher spray coat to be applied which can be deposited with greater efficiency and usually achieve a higher bond strength and simultaneously providing a better hold for the paint.

The seal overcoat can provide color which has been available to boaters for decades and would make it more acceptable in the marketplace where some emphasis is placed on the cosmetics or aesthetics of the finish as opposed to the functionality thereof.

The present invention is a base coated with antifouling copper alloy spray coating covered with the seal overcoat, and a method for preparing the coated structure. The seal overcoat according to the present invention provides a means of prolonging the already long term life span of the antifouling copper alloy spray coating by reducing the oxidation and corrosion coating that takes place during the first year of immersion. Studies indicate that the copper alloy can corrode at an accelerated rate during the first year and after the coating of corrosion products are formed, slows down to average 0.05 mils over a 5-year period but it can be as much a 2 mils the first. This is a 40 times greater than the ultimate average, hence, the seal overcoat, by permeating the surface layer of sprayed coating, since the coating may have up to 20% porosity, will suspend this accelerated corrosion and extend the life of the sprayed coating considerably.

The overcoat according to the invention will also provide at the water line, a screen from direct sunlight. Experiments have shown that the sunlight can adversely effect the corrosion rate of copper and copper alloys. As a shield, the overcoat can be a positive influence to the life of the coating along the water line. Although the antifouling overcoat paint does not have the longevity of the metal spray, by filling the valleys and porosity of the microscopic recesses in the metal sprayed coatings, it will enable the asperities of the metal sprayed coating to be initially exposed and corrode preferentially so that in effect, the "high spots" are subjected to the initial higher corrosion rate and thereby have a smoothing effect on the metal coating over a period of time.

A properly formulated antifouling paint contains no hazardous organotins and can be a valuable adjunct to the metal spray coating with respect to longevity and performance. The overcoat on the sprayed metal coatings may also provide protection against heavy galvanic corrosion. If a hull has some dissimilar metal exposed to the sea water although it may not be in contact with the metal spray coating, yet if electrically connected internally in the hull it can form a continuous path whereby the material, and if it is less noble to the copper/nickel coating, it will corrode very rapidly due to the large area of the copper/nickel vs. the anodic material.

An overcoat will prevent the immediate large current flow by acting as an insulator to the large metal surface. The gradual corrosion of the metal sprayed coating will not cause the highly accelerated attack on the ground metal sections. Ideally, the coating has to be electrically isolated from ground and other metal members of the hull when originally applied.

The properties of the sealed coat are that it has (1) a low surface tension to permit wetting and penetration of the sprayed metal coating surface and porosity. (2) it has leveling and flattening properties to produce a smooth finished surface. (3) some thickening agent to provide thixotropic properties on vertical surfaces. (4) Abalative properties to result in a uniform leaching rate. (5) High copper oxide content for antifouling. A typical formulation for the sealed paint coating is any high percent cuprous oxide or copper based antifouling paint.

The invention can be used with any abalative type antifouling paint diluted with any of the recommended thinners such as: copper napthanate 20%, amine salt of tetrachlorophene 1%, and mineral spirits 79% but not limited to.

Thus, rather than abrading the surfaces by the light wet sanding or other mechanical smoothing operation, the thermally sprayed antifouling surface is painted with an antifouling paint formulated to make the surface "smooth to the touch". The paint has a strong bond by filling in all the valleys and interstices of the sprayed metal coating and has the additional advantage of prolonging the life of the metal coating.

BRIEF DESCRIPTION OF THE DRAWINGS

FIG. 1 is a flow diagram, patterned on the flow diagram disclosed in FIG. 1 of our U.S. Pat. No. 4,618,504 and incorporating the present invention, FIG. 2 is an enlarged section showing the bonding of the sprayed metal coating to the undercuts, nooks and crannies formed by the fractured microballoons according to our U.S. Pat. Nos. 4,521,475 and 4,618,504, FIG. 3 is an enlarged sectional view showing the application of the sealed and smooth coating to the metal coating shown in FIG. 2.

DETAILED DESCRIPTION OF THE INVENTION

Figure 4:
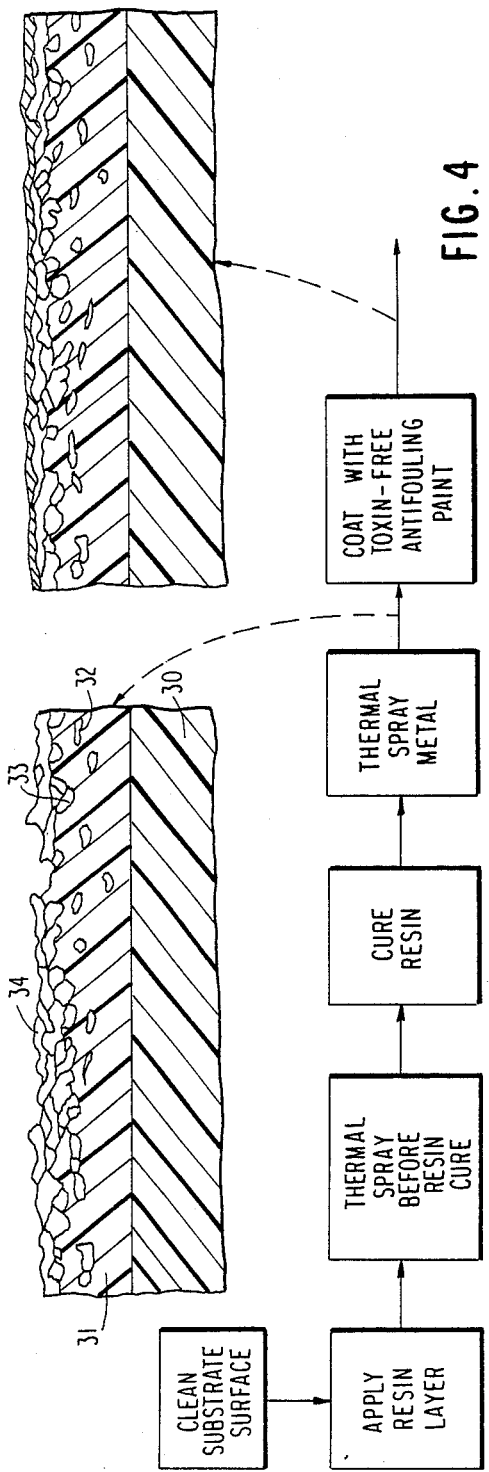
FIG. 4 is a flow diagram of an embodiment of the invention using the thermal spray resin bonding technique disclosed in our U.S. Pat. No. 4,751,113 with the seal and smooth coat according to the present invention applied thereto.

Referring now to FIG. 1, which, as indicated above, is, through the steps including the molten metal spray, essentially the same as disclosed in our U.S. Pat. No. 4,714,623 which is incorporated herein by reference. Basically, the surface to be coated is first cleaned and then a layer of resin applied either by roller, spray, squeegee, etc. and while the resin is still in an uncured state, it is sprayed with micronsized hollow beads or spheres which fill the resin. The resin is then cured so as to produce a substrate 10 having a resin coating 11 which is filled with micronsized hollow beads or spheres 12 which is indicated in the enlarged on the opposite side of the cured resin block. The micron sized hollow bead filled resin is abraded or grit blasted so as to produce nooks, crannies and undercuts 13 formed in the remains of the fractured hollow beads or spheres 12.

The product is then cleaned and dusted so as to remove the remains and dust and produce the product as illustrated in the enlarged cross-sectional view and then the cleaned surface is sprayed with molten metal which in this preferred embodiment copper or copper/nickel alloys to serve as an antifouling coating. This produces a metal coating layer 14 as illustrated in FIG. 2 which is rigidly interlocked to the substrate 10 via the resin layer 11 and the nooks, crannies and undercuts 13 in the micron sized hollow beads or spheres 13. Since this surface is made up of small molten particles which impact on the surface, and initially flows into the micron sized nooks, crannies, and undercuts 13 formed by the remains of the ruptured beads or spheres, this interlocking action also produces a surface which is slightly rough to the touch.

In our U.S. Pat. No. 4,751,113 in order to achieve a smooth to touch surface, after the thermal spray process, a light wet sanding was effected. However, according to the present invention a seal coat 16 is applied to the thermally sprayed antifouling coating as an overcoat. This has numerous advantages which are discussed extensively above. These include a smoother surface which is particularly good at the water line where there is a lot of wave action and sunlight erodes copper faster. Moreover, color can be added to enhance the aesthetics appearance and it can be particularly useful at the heavy wear areas. Moreover, since wire fed thermal spray apparatus produces a slightly rougher coating because of the larger particles of molten metal which impinge on the surface to be coated, a rougher coat can be applied which can be deposited with greater efficiency and usually higher bond strength and simultaneously providing better hold for the paint. This seal overcoat also provides a means of prolonging the already longtime life span of the copper alloy spray by reducing the oxidation and corrosion coating that takes place during the initial life of the immersion in water. See "Copper Mariner Report" by CDA. Moreover, the overcoat provides a water line screen from direct sunlight because experiments have shown that the sunlight can adversely effect the corrosion rate of copper and copper alloys. As a shield, the overcoat can be a positive influence on the life of the coating at the water line.

Although the antifouling paint is not expected to have the longevity of the metal spray, by filling in the valleys, the porosity and microscopic recesses in the spray coating it will enable the asperities of the metal spray coating to be initially exposed and corrode preferentially faster so that in effect the high spots are subjected to the initial high corrosion rates and thereby have a smoothing effect on the metal coating. Moreover, as the discussed extensively above, the overcoating will prevent the immediate large current flow by acting as an insulator to the large metal surface. The gradual corrosion of the metal sprayed coating will not cause the highly accelerated attack on the grounded metal section. Ideally, the coating has to be electrically isolated from ground and other members of the hull when originally applied.

The seal coat preferably has the following properties:

(1) Low surface tension to permit wetting and penetration of the coating surface and porosity.

(2) A leveling and flattening property to produce the smooth finish.

(3) A thickening agent to provide the thixotropic properties which is highly useful for vertical surfaces or surfaces which have vertical components.

(4) Highly abalative properties to result in a uniform leaching rate.

(5) A high copper content for antifouling purposes. In other words, it would not be appropriate to put a normal paint on this surface upon which microorganisms can grow and attach.

The invention can be used with any abalative type antifouling paint diluted with the recommended thinner or the following thinner:

Copper Napthanate: 20%
Amine Salt of Tetrachlorophenal: 1%
Mineral Spirits: 79%

In the embodiment shown in FIG. 4, the teachings of our U.S. Pat. No. 4,751,113 are incorporated through the step of cleaning the substrate surface, applying the resin layer, thermally spraying the resin layer before the resin has cured so as to be imbedded in the resin layer which forms an adhesion and seal layer and while it is tacky and prior to hardening and while the adhesion and seal layer is in a partially cured state so as to form undercuts and roughness in the adhesion and seal layer. Then, after curing the resin if one or more further metal layers constituted by continuous layers of thermally sprayed thermal particles sprayed in a molten state upon the first metal layer and after curing of the adhesion and seal layer. The molten particles of the further layer shape themselves to lock to the embedded first layer by being forced into the undercuts and roughnesses of the surface formed by the first metal layer due to the impact velocity of the molten particles forming the further metal layer. As shown in the enlarged cross sectional view, the substrate 30 has the resin layer 31 adhering thereon and resin layer 31 has particles of metal 32 some of which have become totally immersed in the resin 31 but the majority of which form a first layer 33 forming a surface layer of metal with large undercuts, nooks and crannies due to the impact velocity or energy of the molten metal particles as they impinge on the uncured resin layer.

At the same time, some of the heat from the molten particles began to accelerate the curing of resin layer 31 and, the resin layer with the solidified particles 32,33 therein is solidified and a further thermal spray layer 34 is applied in one or more passes of the thermal spray metal step to form to the desired thickness. This greatly enlarged view shows the effect of the impingements of the molten particles which while having a high degree of uniformity does have a certain roughness which it is designed to smooth over so as to present a better hydronamic surface. In the final step shown in FIG. 4, the substrate with the final thermal sprayed metal layer thereon is coated with a toxin-free antifouiling paint either by rolling, spraying, painting by electrostatic painting, etc. The toxin-free antifouling paint has the same beneficial properties and advantages as discussed earlier herein.

Figure 5:
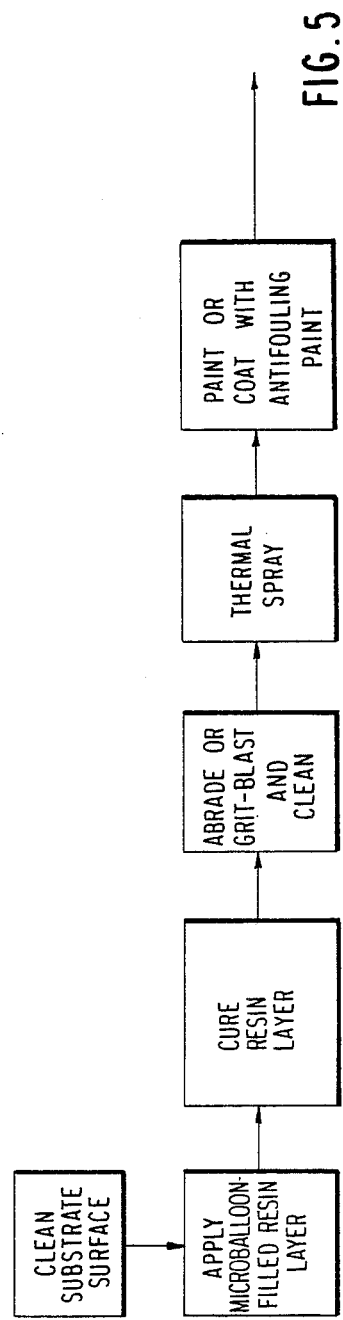
FIG. 5 is a flow diagram of a further embodiment of the invention.

In FIG. 5, the procedure through the thermal spray step is essentially the same as is disclosed in our U.S. Pat. Nos. 4,521,475 and 4,618,504. The final step of painting or coating with an antifouling is as described above in connection with FIGS. 1 and 4.

While there has been shown and described the preferred practices of the invention, it will be understood that this disclosure is for the purpose of illustration and various omissions and changes may be added thereto without departing from the spirit and scope of the invention as set forth the claims appended hereto.

What is claimed is:

1. In an antifouling coating on a base surface comprising, in combination, a resin adhesion layer on said surface and means forming, at the surface of said adhesion layer opposed to said base surface, a plurality of undercuts and surface roughness, one or more thermally sprayed melted layers of a metal selected from the group consisting of copper and copper based alloys wherein molten particles of said thermally sprayed melted layers shape themselves to lock to said undercuts and surface roughness due to the impact velocity of said molten particles, the improvement comprising:

a seal overcoat applied to the outer surfaces of said one or more thermally sprayed layers, said seal overcoat when applied having the following properties: a low surface tension to permit wetting and penetration of the outer one of said thermally sprayed metal layers, leveling and flattening properties to produce a smooth finish, abalative properties to result in a uniform leaching rate and a high copper oxide content for antifouling, and said overcoat including a thickening agent to provide thixotropic properties on vertical surfaces.

2. A method of forming an antifouling metal coating on a marine surface comprising the steps of:
   A. applying a resin coating on said marine surface;
   B. thermally spraying molten metal particles on said resin coating to impinge and interlock with said resin coating, and form one or more metal layers; and
   C. applying a seal overcoat to the last one of said one or more metal layers, said seal overcoat when applied having low surface tension to permit wetting and penetration of the outer one of said one or more metal coatings, leveling and flattening properties to produce a smooth finish on said one or more metal coatings, thixotropic properties, and abalative properties to result in a uniform leaching rate, said overcoat having a high copper oxide content for antifouling.

* * * * *